United States Patent [19]

Blancke

[11] Patent Number: 5,582,369
[45] Date of Patent: Dec. 10, 1996

[54] METHOD OF MINIMIZING, DAMPING OR COMPENSATING DISTURBANCES TO A SPIN-STABILIZED SATELLITE

[75] Inventor: Bernard Blancke, Le Cannet, France

[73] Assignee: Aerospatiale Societe Nationale Industrielle

[21] Appl. No.: 363,370

[22] Filed: Dec. 23, 1994

[30] Foreign Application Priority Data

Dec. 27, 1993 [FR] France ................... 93 15684

[51] Int. Cl.$^6$ ................................................. B64G 1/38
[52] U.S. Cl. ................................................. 244/170
[58] Field of Search ........................ 244/164, 165, 244/169, 170, 171; 364/459; 318/584, 585

[56] References Cited

U.S. PATENT DOCUMENTS

| | | | |
|---|---|---|---|
| 4,023,752 | 5/1977 | Pistiner et al. | 244/169 |
| 4,424,948 | 1/1984 | Muhlfelder et al. | 244/170 |
| 4,504,032 | 3/1985 | Phillips et al. | |
| 4,958,788 | 9/1990 | Namera et al. | 244/169 |
| 5,042,752 | 8/1991 | Surauer et al. | 244/169 |

FOREIGN PATENT DOCUMENTS

| | | |
|---|---|---|
| 0490496 | 6/1992 | European Pat. Off. . |
| 1514745 | 6/1978 | United Kingdom . |
| 2040513 | 8/1980 | United Kingdom . |
| 9304924 | 3/1993 | WIPO . |

*Primary Examiner*—Galen L. Barefoot
*Attorney, Agent, or Firm*—Remy J. VanOphem; Thomas A. Meehan; Remy J. VanOphem

[57] ABSTRACT

For using, on a spin-stabilized satellite, an actuator having an active axis substantially parallel to the spin axis wherein the actuator is activated in a predetermined mode and the resulting nutation period is measured. The actuator is activated in this predetermined mode for at least part of a preliminary step whose duration is equal to a predetermined fraction of the nutation period. This brings the satellite into a configuration in which triggering the service mode of operation induces minimal nutation. The actuator is then activated in this service mode of operation for any predetermined duration. The actuator is then activated under conditions which are the reverse of those of the preliminary step.

9 Claims, 5 Drawing Sheets

METHOD OF MINIMIZING, DAMPING OR COMPENSATING DISTURBANCES TO A SPIN-STABILIZED SATELLITE

BACKGROUND OF THE INVENTION

1. Field of the Invention

The invention relates to minimizing and/or damping disturbances that can affect a spin-stabilized satellite, for example, a geostationary remote sensing satellite.

It is directed in particular, although not exclusively, to minimizing and/or damping nutation phenomena.

2. Description of the Prior Art

It is usual to distinguish two phases (of very different duration) in the service life of a satellite: the orbital injection phase in which the satellite is moved to its service orbit from a transfer orbit and placed in an appropriate attitude, followed by the station-keeping phase, i.e. the operational life of the satellite, i.e. the phase during which the satellite fulfills its mission.

At present, the orbital injection phase for spin-stabilized satellites uses a Solid (powder) fuel apogee motor; it is intended that future generations of satellites will use a liquid fuel motor, having several nozzles distributed around the rotation axis (for example, see European Patent-A-0 445 011). This enables the use of a unified fuel supply system for the apogee motor and for the attitude control thrusters; it also increases operational flexibility as liquid fuel thrusters have an advantage over solid fuel thrusters in that they can be turned on and off at will. More generally, liquid fuel thrusters add to the flexibility of satellite design. It follows that there are substantial mass saving possibilities.

As mentioned in document European Patent-A-0 445 011, it is tolerable for there to be only one eccentric thruster in service, given the gyroscopic stiffness of the spin-stabilized satellite; however, carrying out orbital injection using a single eccentric thruster can cause disturbances including nutation and variation in the spin speed of the satellite, which may require costly speed adjustments at the end of orbital injection.

After orbital injection the satellite may suffer various disturbances likely to degrade its performance in fulfilling its mission (its remote sensing mission, for example):

movement of mobile parts of the satellite (for example scanning mirrors and/or mechanisms) parallel to the rotation axis can cause nutation of the satellite and variation of its inertial properties, operation of small thrusters to perform control maneuvers (attitude, orbit, spin speed) also causes nutation, solar eclipses, with a duration up to 72 minutes on 90 days in each year, eliminate the possibility of synchronizing EAST-WEST scanning (imaging) operations with the Sun, and cause a significant variation in the spin speed of the satellite because of thermal contraction of the satellite.

With regard to the first two disturbances, the strategy currently adopted is to damp the induced nutation of the satellite by means of passive dampers (typically of the mercury or "Flutex" type); this does not prevent degraded imaging during and just after a maneuver; also, with regard to the first disturbance, this strategy may be unsuitable for future satellites in which the mobile parts are larger (heavier instruments), faster (shorter imaging cycles) and move over greater distances (black body pointing for infrared sensor calibration).

With regard to the third disturbance, the strategy currently adopted is to synchronize imaging by means of the terrestrial sensor or the on-board clock; in both cases the image is degraded (high noise in the case of the terrestrial sensor, fast drift in the case of the on-board clock); this is deemed to be tolerable in that the visible light channels cannot be used anyway during a solar eclipse; on the other hand, on second generation satellites, the provision of many infrared channels which can continue to operate even in a solar eclipse means that this problem has to be reconsidered.

A first object of the invention is to minimize the effects of nutation induced by the prolonged operation of an actuator operative parallel to the rotation axis or by displacement of mobile parts parallel to this axis.

Another object of the invention, which may be independent of the first object, is to provide effective compensation of pre-existing nutation by means of appropriate transverse pulses.

A further object of the invention, which may be independent of the previous two objects, is to minimize the aforementioned effect of spin speed variation when thrust is applied by a single eccentric thruster.

A still further object of the invention, independent of the previous three objects, is to maintain synchronism between imaging and rotation, even during a solar eclipse.

SUMMARY OF THE INVENTION

In a first aspect the invention resides in a method of using, on a spin-stabilized satellite, an actuator having an active axis substantially parallel to the spin axis and a service mode of operation, including:

a nutation characterizing step in which the actuator is activated in a predetermined mode and the resulting period of nutation is measured, this characterization step having a duration equal to an integer number of the nutation periods, a preliminary step during parts at least of which the actuator is activated in the predetermined mode, the duration of this preliminary step being equal to a predetermined fraction of the nutation period, this preliminary step being adapted to bring the satellite into a configuration in which triggering of the service mode of operation induces minimal nutation, an operational step during which the actuator is activated in the service mode of operation for any predetermined duration, and a final step, the duration of which is equal to that of the preliminary step and which is symmetrical thereto about the operational step.

In accordance with preferred features of the invention, some of which may be combinable with others:

the actuator is an on-off device, the predetermined mode is identical to the service mode of operation, the preliminary step constitutes a first sub-phase having a duration of ⅙ nutation period during which the actuator is activated and a second sub-phase of the same duration during which the actuator is de-activated, the final step constituting a first sub-phase with a duration of ⅙ period during which the actuator is de-activated and a second sub-phase during which the actuator is active in the service mode of operation, the on/off actuator is a thruster eccentric to the spin axis, the actuator is a progressive action device, the predetermined mode corresponds to half the service mode of operation, and the preliminary and final steps each have a duration of one half-period, the predetermined mode being maintained throughout the duration of the preliminary and final steps, the actuator includes a member mobile substantially parallel to the spin axis, the predetermined mode being a displacement of this mobile member at half its speed of displacement in the service mode of operation, and the nutation period is measured by accelerometers with sensing axes substantially parallel to the spin axis.

In a second aspect the present invention resides in a method of the kind defined hereinabove wherein acceleration of at least one area of the satellite parallel to the spin axis is sensed and a period succession of pulses is generated to generate parallel torques transverse to the axis with a period equal to a multiple equal to one or more of the nutation period of the acceleration signal.

In a third aspect the invention resides in a method of the kind defined hereinabove wherein thrust is applied in a direction at an angle α to a plane passing through the spin axis and the point of application of this thrust, this angle α being given by the equation:

$$\sin \alpha = \frac{(\rho^2 - K_z^2) \cdot \omega_z}{\rho g_o Isp}$$

where:

ρ is the radius at which gas is ejected, $K_z$ is the radius of gyration about Z, $\omega_z$ is the angular speed about Z, $g_o$=9.81 ms$^2$, Isp is the specific impulse of the thrust.

In a fourth aspect the invention resides in a method wherein passages of the Earth in the field of view of a terrestrial sensor are detected, the temperature is sensed at various points on the satellite and, using a predetermined thermal model, an estimate of the instantaneous spin speed is deduced therefrom, and the phase delay to be applied between detection of a passage of the Earth in the field of view of the terrestrial sensor and triggering of an imaging operation is determined.

Objects, features and advantages of the invention emerge from the following description given by way of non-limiting example with reference to the appended drawings.

DESCRIPTION OF THE PREFERRED EMBODIMENT

Figure 1:
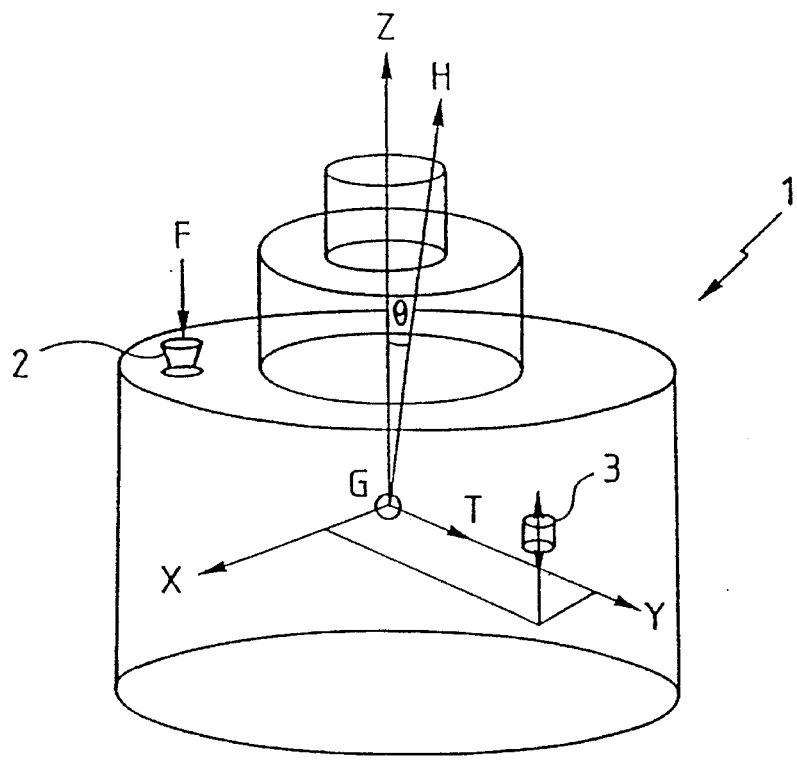
FIG. 1 is a diagrammatic perspective view of a spin-stabilized satellite.

FIG. 1 is a schematic representation of a spin-stabilized satellite 1 rotating about a main inertial axis Z. At its center of mass G two transverse axes X and Y form with Z a direct reference trihedron. The thrust axis of the thruster is substantially in the XGZ plane.

The satellite includes a thruster 2 which when fired applies a thrust F to the satellite parallel to Z. The satellite also includes at least one high-sensitivity accelerometer 3 whose sensing direction is parallel to Z. This sensor is, for example, a prior art capacitive sensor which operates by sensing the position of an oscillating mass damped by a nitrogen atmosphere.

Because the thruster 2 is eccentric, application of the thrust F generates a torque T about the Y axis and therefore a tilt θ of the moment of inertia about the X axis.

Continued application of the thrust induces nutation.

This nutation is detected by the accelerometer(s) 3; in practice there are several accelerometers distributed around the rotation axis; these accelerometers provide a continuous measurement of the amplitude and the phase of angular acceleration due to nutation; this information is used for automatic turning on and off of the thrusters or automatic starting/stopping of movement of mobile parts of the satellite, in accordance with a precise profile.

Figure 2:
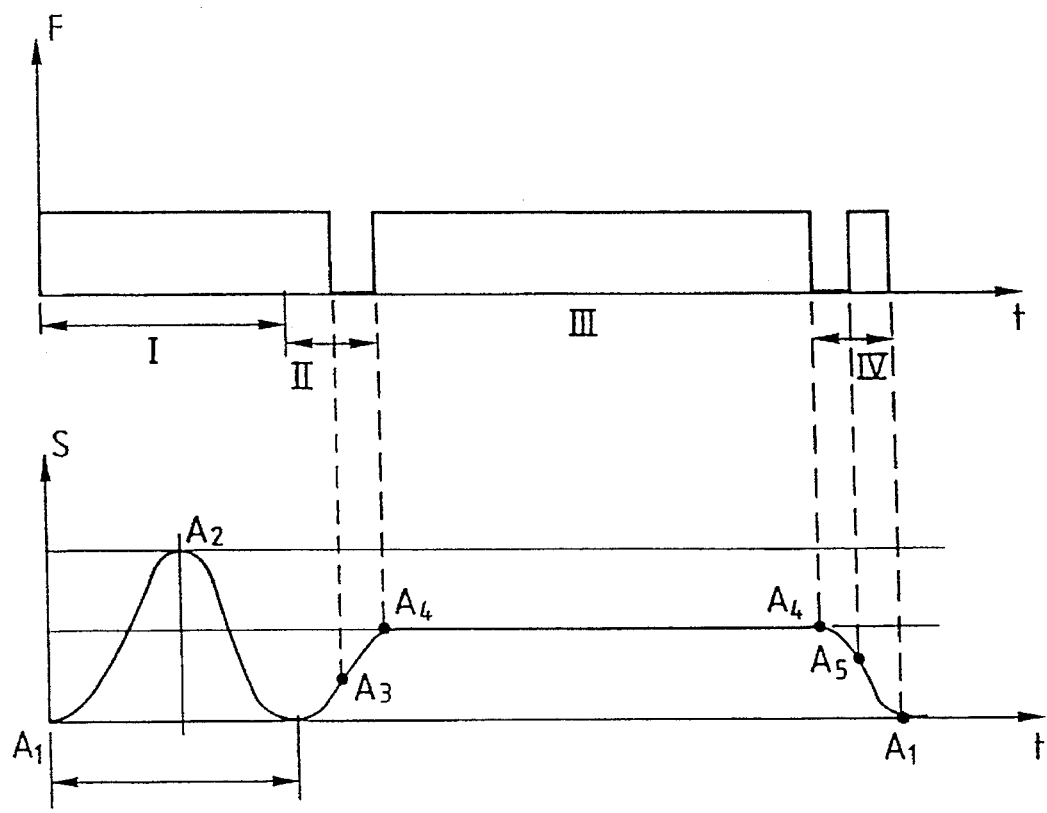
FIG. 2 is a graph showing the variation in time of the thrust F of a thruster and of the detection signal produced by an accelerometer.
Figure 3:
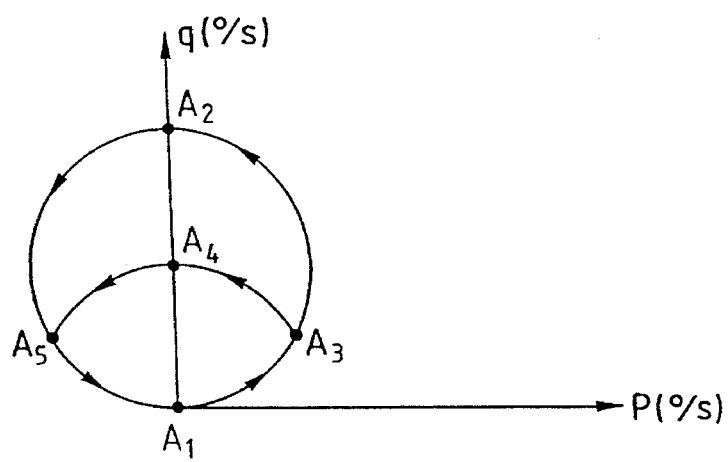
FIG. 3 is a diagram showing the positions of the points from FIG. 2 in the phase plane.

In the situation discussed here (nutation induced by an eccentric thruster) FIG. 2 shows the profile of use of the thruster, with data from FIG. 2 transferred to FIG. 3.

Operation of the thruster (or any actuator). operating on an on/off basis includes four phases:

a phase I of characterizing the nutation induced by the thruster; the thruster is turned on for an integer number of nutation periods; the high sensitivity and the speed of operation of the accelerometers enable very fast measurement of this period, to the extent that operation of the thruster can be restricted to a single period. During this period the point representing the phase of the satellite in the phase plane (p and g are by convention angular speeds and in this example the accelerometer signal S (FIG. 2) is proportional to g therefore moves from $A_1$ (initial position) to $A_2$ (FIG. 2 maximum) and then back to $A_1$;

a preliminary phase II for moving the nutation phase to a point in the phase plane such that the phase thereafter remains stationary on application of the required thrust; this preliminary phase entails the thruster operating for ⅙ the nutation period (this is enough time for the accelerometer to identify the end of nutation period even if phase I lasts only one period), which moves the phase point to $A_3$; turning off the thruster modifies the trajectory of the phase point, which moves from $A_3$ towards the center $A_4$ of the first trajectory. The thruster is turned off for ⅙ the nutation period. The phase point reaches $A_4$;

an operational phase III during which the thruster applies the required thrust. Because the phase point is at position $A_4$, turning on and operation of the thruster do not change the phase point: it remains at $A_4$ and there is no nutation;

a terminal phase IV which is the opposite of the preliminary phase II, i.e. the thruster is turned off again. The phase point resumes its movement along the second trajectory from $A_4$ to its intersection $A_5$ with the first trajectory, after which it returns to $A_1$ along the first trajectory.

If the potential cause of nutation is progressive in action (rather than on/off), for example movement of mobile parts parallel to Z, between $Z_0$ and $Z_1$, the profile is as follows:

- a preliminary phase II during which the movement is at half-speed, for half a nutation period (plus any integer number of periods, not shown, to identify the duration of the nutation period);
- an operational phase III during which the movement is at full-speed; its duration has any value, determined by the required action;
- a terminal phase IV which is the opposite of the preliminary phase and during which the movement is at half-speed for half a nutation period.

Figure 5:
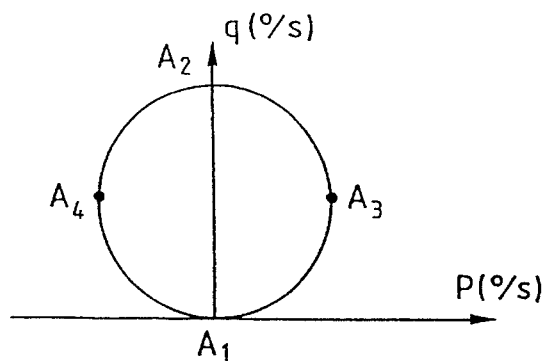
FIG. 5 is a diagram showing the positions of points from FIG. 4 in the phase plane.
Figure 4:
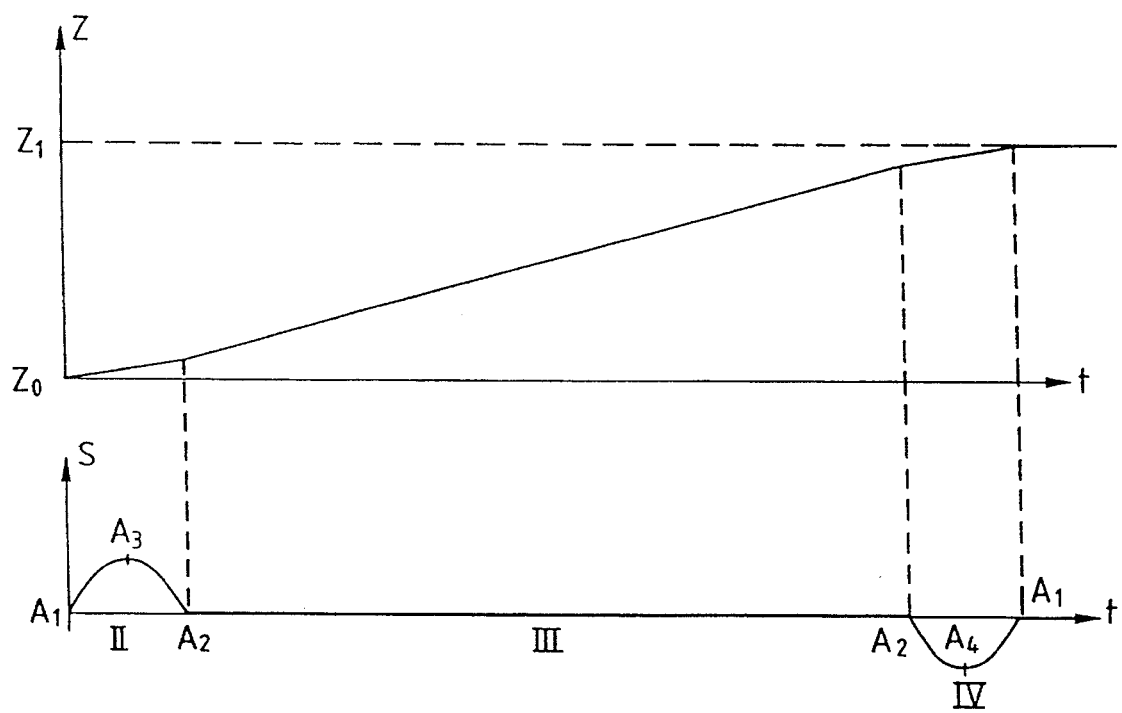
FIG. 4 is a graph similar to FIG. 2 for movement of mobile parts parallel to Z.

The phase diagram in FIG. 5 is different from that in FIG. 3 because during phases I, II and III the phase point moves along only one trajectory. On the other hand, FIGS. 3 and 5 show that at the start of the operational phase III the phase point is already at the location to which the initiation of this phase tends to move the center of the resulting nutation circle: the radius of this circle is therefore (substantially) zero.

The efficacy of the provisions described above depends on the degree to which the thruster pulses are reproducible or the accuracy with which movement of mobile parts can be controlled, as well as on the accuracy of the accelerometers.

Figure 6:
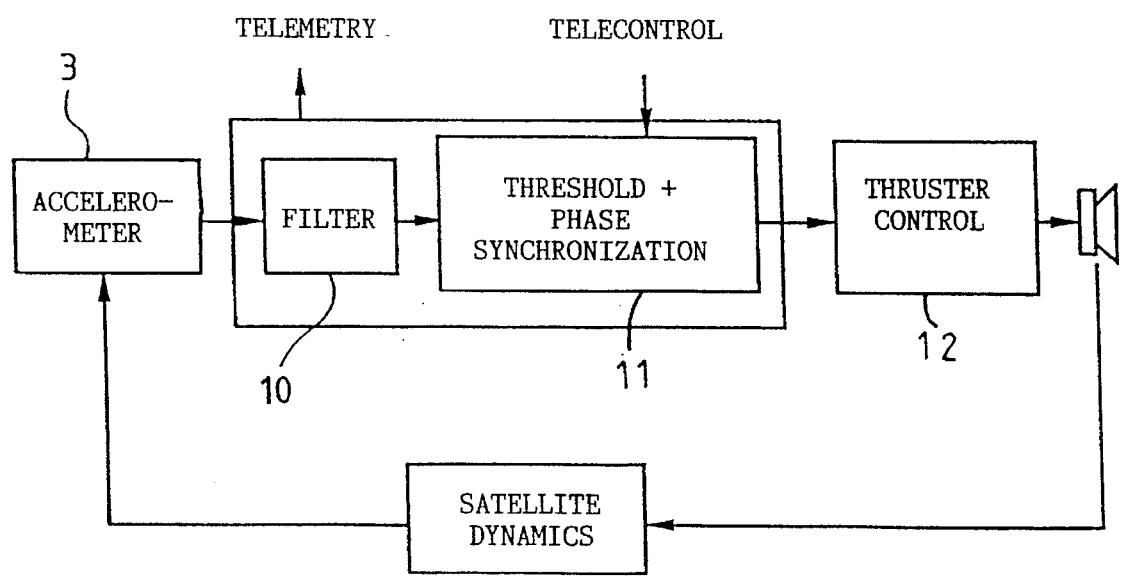
FIG. 6 is a block diagram of an active nutation damping loop.
Figure 7:
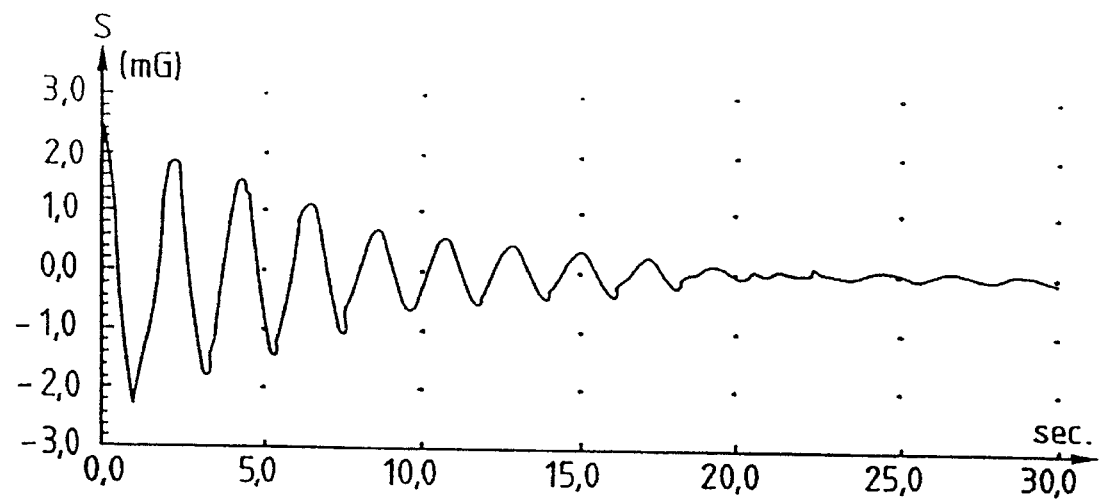
FIG. 7 is a diagram showing the variation with time of the accelerometer signal S, the nutation angle and the transverse thrust (short pulses) for active nutation damping.
Figure 7:
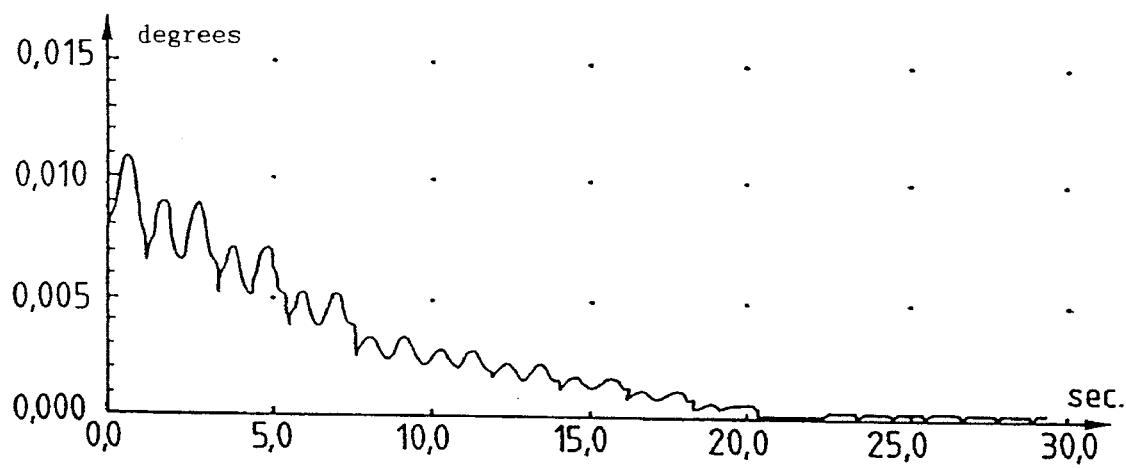
Figure 7:
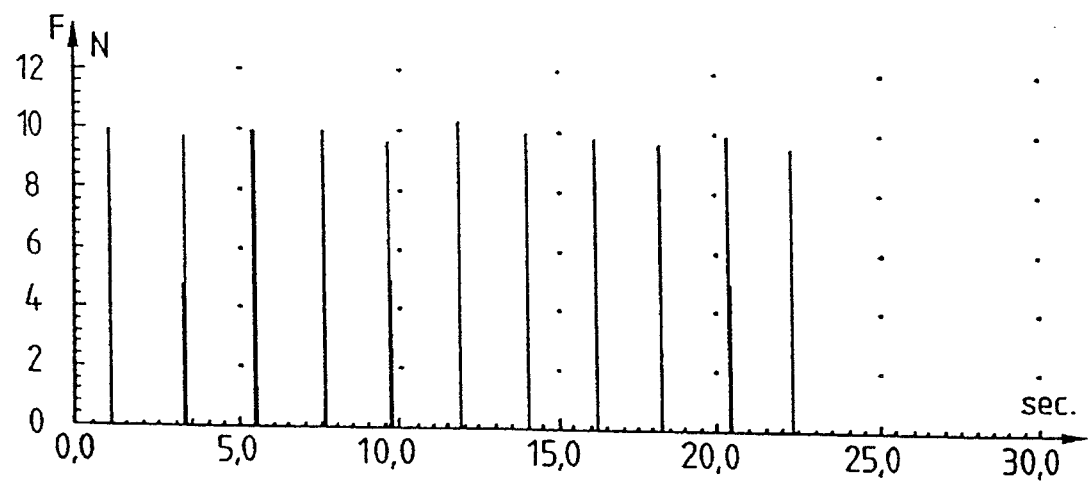
Figure 8:
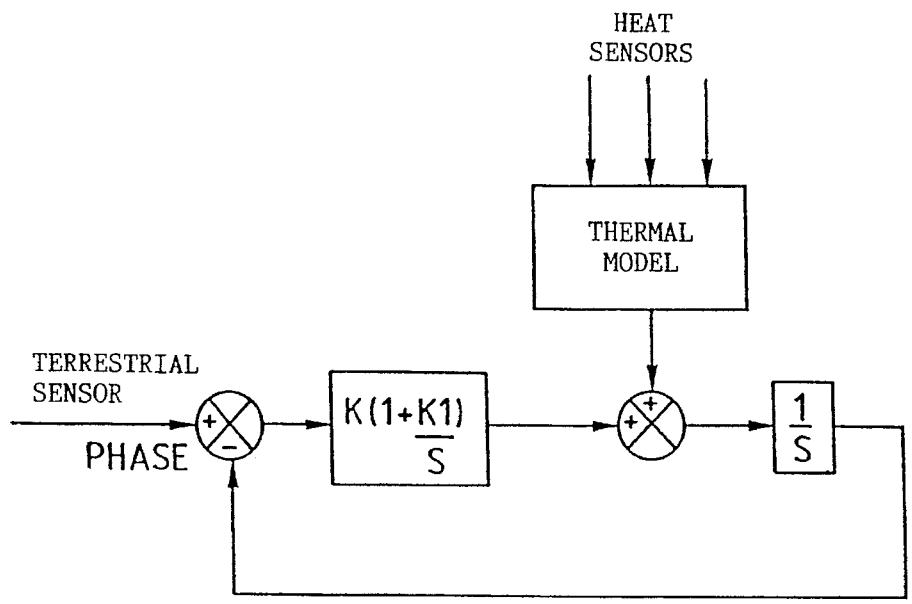
FIG. 8 is a block diagram of a thermal compensation loop.

FIGS. 6 and 7 relate to active nutation damping (this situation differs from those previously discussed, in which the objective is to induce as little nutation as possible).

In the case of attitude control and east-west orbit control maneuvers, the thruster thrust is necessarily pulsed, with a period equal to the rotation period of the satellite, as these maneuvers must result from inertial effects perpendicular to the satellite rotation axis; the previous solution for minimizing nutation cannot be used in this situation; fortunately, these maneuvers are usually of short duration, and can be carried out during a non-imaging phase (for example during calibration or resetting of the scanning mechanism) and the nutation induced damped before imaging is resumed.

Fast and effective damping can be provided by a control loop (FIG. 6) using the previously mentioned ultra-sensitive accelerometers 3 as sensors and the attitude control thrusters (not shown in FIG. 1) as actuators; a control filter 10 driving phase synchronization and threshold logic 11 driving thruster control units 12 commands thruster pulses phase-shifted relative to the nutation oscillation, this phase-shift depending on the physical position of the accelerometers and thrusters on the satellite; this filter is also optimized to minimize the effect of variations in the nutation period during the life of the satellite (due to changes in the inertial characteristics and the spin speed).

FIG. 7 shows the results of simulating the above process: the pulses are synchronized with the minima of the accelerometer signal S; the nutation angle fluctuates at twice the frequency of the signal S or the pulses and returns rapidly to zero (in less than 25 seconds).

Referring again to FIG. 1, it has already been pointed out that operation of the thruster causes a variation in the spin speed.

The variation in the spin speed of the satellite caused by the thrust of one or more thrusters is largely deterministic; it depends on the initial speed, on the distance of the gas ejector orifice from the rotation axis, on the radius of gyration of the satellite and on the time for which the thrust is applied; if the thrust is applied for a long period the variation can be large and so can cause a large increase in the centrifugal forces (speed increase) or a reduction in gyroscopic stability (speed reduction).

It can therefore be beneficial to compensate this effect from the outset, by orienting the thruster on the satellite so that the thrust causes a torque about the spin axis compensating the aforementioned effect.

To be more precise, the torque about Z is given by the equation:

$$M_z = I_z \dot{\omega}_z + (I_y - I_x) \dot{\omega}_x \dot{\omega}_y - [\dot{m}(\rho^2 - K_t^2) - m \frac{d}{dt} K_t^2]\omega_z + \Gamma_z$$

where:

$I_x$, $I_y$, $I_z$ are the moments of inertia of the satellite about the X, Y and Z axes, respectively, $\omega_x$, $\omega_y$, $\omega_z$ are the angular speeds of the satellite about the X, Y and Z axes, respectively, $\dot{m}$ is the mass flowrate of the liquid fuel, $\rho$ is the radius at which the gas is ejected (thruster eccentricity), $K_z$ is the radius of gyration about Z: $I_z = m.K_t^2$, $\Gamma_z$ is the torque exerted by the thruster due to it not being parallel to the rotation axis.

In the simple case where:

$$I_x = I_y \text{ (cylindrical shape) and } \frac{d}{dt} K_t^2 = 0,$$

the above equation is rewritten:

$$M_z = I_z \dot{\omega}_z - [\dot{m}(\rho^2 - K_t^2)]\omega_z + \Gamma_z$$

The total torque is zero (and thus $\dot{\omega}_z$ is constant) if:

$$\Gamma_z = \dot{m}(\rho^2 - K_t^2)\omega_z$$

If F is the thrust:

$$\dot{m} = \frac{F}{g_o \cdot Isp}$$

where the value of $g_o$ is 9.81 m/s$^2$,
Isp is the specific impulse of the liquid fuel.

It follows that:

$$\Gamma_z = F\rho\sin\alpha$$

where $\alpha$ is the angular offset between the thrust axis and the rotation axis; to be more precise, this is the angle between the thrust axis and the plane passing through the thruster.

It follows that $M_z = 0$ if:

$$\sin\alpha = \frac{(\rho^2 - K_z^2) \cdot \omega_z}{\rho g_o Isp}$$

For the torque due to the thruster to compensate the effect of the mass flow rate in the rotating system of axes all that is required is to maintain $\alpha$ at this value.

During the Earth remote sensing mission the pulses output by the terrestrial sensor are filtered (by an analog or digital, for example second order filter) to reduce the high level of noise effecting the sensor signal; this filtering inevitably introduces a time-delay proportional to the required noise reduction; for a constant satellite spin speed this time-delay is constant and can be precompensated.

In a solar eclipse, however, the spin speed of the satellite varies quickly because of the transient thermal contraction of the entire satellite, and the time-delay varies quickly; to minimize this effect the invention measures the contraction of the satellite continuously, using appropriately disposed thermistors in conjunction with a simplified model of the thermo-elastic behavior of the satellite; this contraction measurement is then converted to a spin speed measurement and fed into the filter loop of the terrestrial sensor. This is therefore a feed-forward system.

The performance of this system depends mainly on the degree to which the model of thermo-elastic deformation of the satellite is representative of what actually happens; the model can be predetermined (Nastran type modelling) and/or calibrated at the start of the service life of the satellite.

Figure 10:
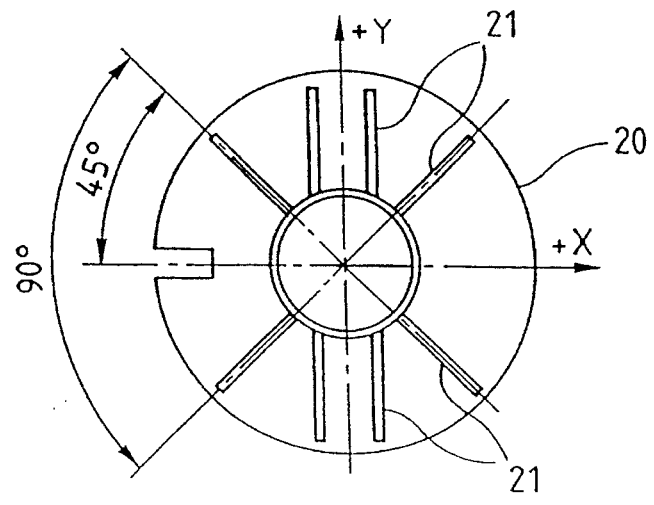
FIG. 10 is a view in transverse section showing the location of various heat sensors.

FIG. 7 shows the thermal compensation loop processing the phase as measured by the terrestrial sensor and injecting a correction calculated using a thermal model from the output of thermistors 21, shown in FIG. 10.

Referring to FIG. 10, the thermistors 21 are disposed transversely to the axis of a main platform 20 of the satellite, for example: there are four radial thermistors at 90°, plus four thermistors parallel to and laterally offset relative to a common diameter.

Figure 9:
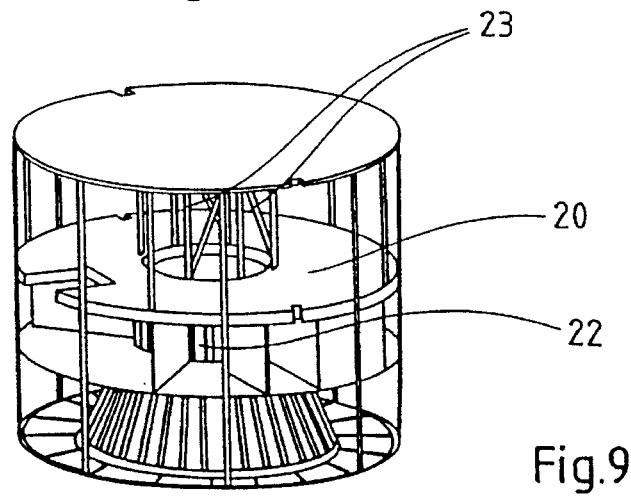
FIG. 9 is a diagrammatic perspective view of the satellite.

FIG. 9 shows a central tube 22 and linking bars 23.

It goes without saying that the foregoing description has been given by way of non-limiting example only and that numerous variants can be put forward by the person skilled in the art without departing from the scope of the invention.

There is claimed:

1. Method of using, on a spin-stabilized satellite, an actuator having an active axis substantially parallel to the spin axis and a service mode of operation, said method comprising:

a nutation characterizing step in which said actuator is activated in a predetermined mode and the resulting period of nutation is measured, said characterization step having a duration equal to an integer number of said nutation periods;

a preliminary step during parts at least of which said actuator is activated in said predetermined mode, the duration of said preliminary step being equal to a predetermined fraction of said nutation period, said preliminary step being adapted to bring said satellite into a configuration in which triggering of said service mode of operation induces minimal nutation;

an operational step during which said actuator is activated in said service mode of operation for any predetermined duration; and a final step, the duration of which is equal to that of said preliminary step and which is symmetrical thereto about said operational step.

2. Method according to claim 1 wherein said actuator is an on-off device, said predetermined mode is identical to said service mode of operation, said preliminary step further comprises a first sub-phase having a duration of ⅙ nutation period during which said actuator is activated and a second sub-phase of the same duration during which said actuator is de-activated, said final step comprising a first sub-phase with a duration of ⅙ period during which said actuator is de-activated and a second sub-phase during which said actuator is active in said service mode of operation.

3. Method according to claim 2 wherein said on/off actuator is a thruster eccentric to the spin axis.

4. Method according to claim 1 wherein said actuator is a progressive action device, said predetermined mode corresponds to half said service mode of operation, and said preliminary and final steps each have a duration of one half-period, said predetermined mode being maintained throughout the duration of said preliminary and final steps.

5. Method according to claim 4 wherein said actuator includes a member mobile substantially parallel to the spin axis, said predetermined mode being a displacement of said mobile member at half its speed of displacement in said service mode of operation.

6. Method according to claim 1 wherein said nutation period is measured by accelerometers with sensing axes substantially parallel to the spin axis.

7. Method according to claim 1 wherein acceleration of at least one area of said satellite parallel to the spin axis is sensed and a periodic succession of pulses is generated to generate parallel torques transverse to the open axis with a period equal to a multiple equal to one or more of said nutation period of the acceleration signal.

8. Method according to claim 1 wherein thrust is applied in a direction at an angle $\alpha$ to a plane passing through the spin axis and the point of application of said thrust, said angle $\alpha$ being given by the equation:

$$\sin \alpha = \frac{(\rho^2 - K_z^2) \cdot \omega_z}{\rho g_o \, Isp}$$

where:

$\rho$ is the radius at which gas is ejected, $K_z$ is the radius of gyration about Z, $\omega_z$ is the angular speed about Z, $g_o = 9.81$ ms$^2$, Isp is the specific impulse of the thrust.

9. Method according to claim 1 wherein passages of the Earth in the field of view of a terrestrial sensor are detected, the temperature is sensed at various points on said satellite and, using a predetermined thermal model, an estimate of the instantaneous spin speed is deduced therefrom, and the phase delay to be applied between detection of a passage of the Earth in the field of view of said terrestrial sensor and triggering of an imaging operation is determined.

* * * * *

UNITED STATES PATENT AND TRADEMARK OFFICE
CERTIFICATE OF CORRECTION

PATENT NO. : 5,582,369
DATED : December 10, 1996
INVENTOR(S) : Bernard Blancke

It is certified that error appears in the above-identified patent and that said Letters Patent is hereby corrected as shown below:

Column 1, line 10, after "example" delete the comma ",".

Column 1, line 23, delete "Solid" and insert ----solid ----.

Column 1, line 34, delete "document".

Column 4, line 31, after "actuator)" delete the period ".".

Column 4, line 42, after "g" insert ---- ) ---- .

Column 6, line 7, after "($p^{2-}$" delete "$K_t^2$)" and insert ---- $K_t^2$) ----.

Column 6, line 31, after "$\Gamma_z$" insert an equal sign.

Column 8, line 25, delete "open" and insert ---- spin ----.

Signed and Sealed this

Twenty-fourth Day of February, 1998

*Attest:*

BRUCE LEHMAN

*Attesting Officer*     *Commissioner of Patents and Trademarks*